US010711857B2

(12) United States Patent
Nagai et al.

(10) Patent No.: US 10,711,857 B2
(45) Date of Patent: Jul. 14, 2020

(54) BICYCLE DISC BRAKE ROTOR (71) Applicant: Shimano Inc., Sakai, Osaka (JP)

(72) Inventors: Akio Nagai, Osaka (JP); Wataru Yamauchi, Osaka (JP); Toru Iwai, Osaka (JP)

(73) Assignee: Shimano Inc., Osaka (JP)

( * ) Notice: Subject to any disclaimer, the term of this patent is extended or adjusted under 35 U.S.C. 154(b) by 800 days.

(21) Appl. No.: 14/712,082

(22) Filed: May 14, 2015

(65) Prior Publication Data

US 2016/0333949 A1 Nov. 17, 2016

(51) Int. Cl.
*F16D 65/12* (2006.01)
*F16D 65/02* (2006.01)

(52) U.S. Cl.
CPC ......... *F16D 65/128* (2013.01); *F16D 65/125* (2013.01); *F16D 2065/132* (2013.01); *F16D 2200/0004* (2013.01); *F16D 2200/0034* (2013.01); *F16D 2200/0078* (2013.01)

(58) Field of Classification Search
CPC ........ F16D 65/12; F16D 65/78; F16D 65/128; F16D 65/847; F16D 2055/0004; F16D 2055/0075; F16D 2065/134; F16D 2065/1304; F16D 2065/1316; F16D 2065/1332; B62L 1/005; B62L 3/02; B62L 3/023
USPC ........ 188/18 A, 26, 218 XL, 264 A, 264 AA
See application file for complete search history.

(56) References Cited

U.S. PATENT DOCUMENTS

| 1,924,622 | A | * | 8/1933 | Norton | ................ F16D 65/08 188/250 E |
| 2,710,078 | A | | 6/1955 | Cardwell | |
| 6,530,457 | B1 | | 3/2003 | Nago et al. | |
| 6,585,089 | B1 | * | 7/2003 | Parker | ................ F16D 65/092 188/218 XL |
| 7,219,777 | B2 | | 5/2007 | Lin | |
| 7,273,135 | B2 | * | 9/2007 | Aisenbrey | ........... B29C 45/0013 188/164 |
| 8,002,090 | B2 | * | 8/2011 | Yasukawa | ............. B60T 13/741 188/156 |
| 8,281,907 | B2 | * | 10/2012 | Fryska | ................ F16D 65/12 188/218 A |
| 2003/0089563 | A1 | * | 5/2003 | Takakusagi | ............ C09D 5/084 188/218 XL |
| 2005/0006186 | A1 | * | 1/2005 | Iwai | ....................... B62L 1/005 188/26 |
| 2008/0073165 | A1 | | 3/2008 | Rau et al. | |
| 2008/0142319 | A1 | | 6/2008 | Manter | |
| 2008/0202867 | A1 | | 8/2008 | Danzer et al. | |
| 2008/0289918 | A1 | | 11/2008 | Boike et al. | |

(Continued)

FOREIGN PATENT DOCUMENTS

CN 101543143 A 9/2009
TW I381973 B1 1/2013

*Primary Examiner* — Christopher P Schwartz
(74) *Attorney, Agent, or Firm* — Global IP Counselors, LLP (57) ABSTRACT

A bicycle disc brake rotor is basically provided with a main body and a heat release layer. The main body is made of a metallic material. The main body includes an outer portion, an inner portion and a cooling facilitation part. The outer portion has oppositely facing braking surfaces. The heat release layer includes a non-metallic material. The heat release layer at least partially overlies the cooling facilitation part.

21 Claims, 8 Drawing Sheets (56) References Cited

U.S. PATENT DOCUMENTS

| | | |
|---|---|---|
| 2010/0258394 A1 | 10/2010 | Hanna et al. |
| 2011/0240420 A1 | 10/2011 | Souwa et al. |
| 2012/0000736 A1 | 1/2012 | Koshiyama |
| 2013/0168193 A1* | 7/2013 | Iwai .................. F16D 65/12 188/218 XL |
| 2014/0117745 A1* | 5/2014 | Wilke .................. B60B 21/08 301/6.9 |
| 2015/0041262 A1 | 2/2015 | Meckel |

* cited by examiner

BICYCLE DISC BRAKE ROTOR

BACKGROUND

Field of the Invention

This invention generally relates to a bicycle disc brake rotor. More specifically, the present invention relates to a bicycle disc brake rotor with a configuration that promotes cooling of the braking surfaces.

Background Information

In recent years, some bicycles have been provided with disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad(s). The brake pads are positioned on either side of a rotor, which is attached to the front or rear wheel of a bicycle. The brake pads are pressed against a brake disc or rotor that is fixed to the wheel to slow down or stop the rotation of the disc, and thus, slow down or stop the rotation of the wheel.

SUMMARY

Generally, the present disclosure is directed to various features of a bicycle disc brake rotor. While disc brake systems provide excellent performance, the braking action tends to generate a substantial amount of heat in the disc brake rotor. Thus, one aspect present in this disclosure is to provide a disc brake rotor with a configuration that more efficiently radiates heat from the outer portion of the disc brake rotor.

In view of the state of the known technology and in accordance with a first aspect of the present disclosure, a bicycle disc brake rotor is provided that basically comprises a main body and a heat release layer. The main body is made of metallic material. The main body includes an outer portion, an inner portion and a cooling facilitation part. The outer portion has oppositely facing braking surfaces. The heat release layer includes a non-metallic material. The heat release layer at least partially overlies the cooling facilitation part.

In accordance with a second aspect of the present invention, the bicycle disc brake rotor according the first aspect is configured so that the heat release layer has a thickness of about 0.02 mm.

In accordance with a third aspect of the present invention, the bicycle disc brake rotor according to the first aspect is configured so that the heat release layer includes a heat resistant paint.

In accordance with a fourth aspect of the present invention, the bicycle disc brake rotor according to the third aspect is configured so that the heat resistant paint includes a resin.

In accordance with a fifth aspect of the present invention, the bicycle disc brake rotor according to the first aspect is configured so that the heat release layer has a thermal emissivity that is larger than a thermal emissivity of the outer portion.

In accordance with a sixth aspect of the present invention, the bicycle disc brake rotor according to the fifth aspect is configured so that the heat release layer includes a heat resistant resin, and the outer portion is made of an aluminum alloy.

In accordance with a seventh aspect of the present invention, the bicycle disc brake rotor according to the first aspect is configured so that the cooling facilitation part includes a metallic cooling fin radially offset from the outer portion, the heat release layer being disposed on the metallic cooling fin.

In accordance with an eighth aspect of the present invention, the bicycle disc brake rotor according to the seventh aspect is configured so that the metallic cooling fin is disposed on an inner peripheral edge of the outer portion.

In accordance with a ninth aspect of the present invention, the bicycle disc brake rotor according to the seventh aspect is configured so that the outer portion includes a first braking part and a second braking part, and the cooling facilitation part includes an attachment portion sandwiched between the first and second braking parts.

In accordance with a tenth aspect of the present invention, the bicycle disc brake rotor according to the first aspect is configured so that the inner portion includes a mounting part that is fastened to the outer portion.

In accordance with an eleventh aspect of the present invention, the bicycle disc brake rotor according to the tenth aspect is configured so that the mounting part includes a center mounting section and a plurality of arms extending between the outer portion and the center mounting section.

In accordance with a twelfth aspect of the present invention, the bicycle disc brake rotor according to the first aspect is configured so that the inner portion includes a disc shaped section having at least one protrusion extending in an axial direction with respect to a center rotational axis of the bicycle disc brake rotor, the heat release layer being disposed on the at least one protrusion.

In accordance with a thirteenth aspect of the present invention, the bicycle disc brake rotor according to the twelfth aspect is configured so that the at least one protrusion includes a plurality of protrusions having the heat release layer being disposed thereon.

In accordance with a fourteenth aspect of the present invention, the bicycle disc brake rotor according to the first aspect is configured so that the inner portion includes a disc shaped section at least partially covered by the heat release layer.

In accordance with a fifteenth aspect of the present invention, a bicycle disc brake rotor is provided that basically comprises a main body and a heat release layer. The main body is made of a metallic material. The main body includes an outer portion and an inner portion. The outer portion has oppositely facing braking surfaces. The heat release layer includes a non-metallic material. The heat release layer is partially disposed on the inner portion.

In accordance with a sixteenth aspect of the present invention, a bicycle disc brake rotor is provided that basically comprises a main body and a heat release layer. The main body is made of a metallic material. The main body includes an outer portion and an inner portion. The outer portion has oppositely facing braking surfaces. The heat release layer includes a non-metallic material. The inner portion includes a first area on which the heat release layer is disposed and a second area which is free of the heat release layer.

Also other objects, features, aspects and advantages of the disclosed bicycle disc brake rotor will become apparent to those skilled in the art from the following detailed description, which, taken in conjunction with the annexed drawings, discloses embodiments of the bicycle disc brake rotor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
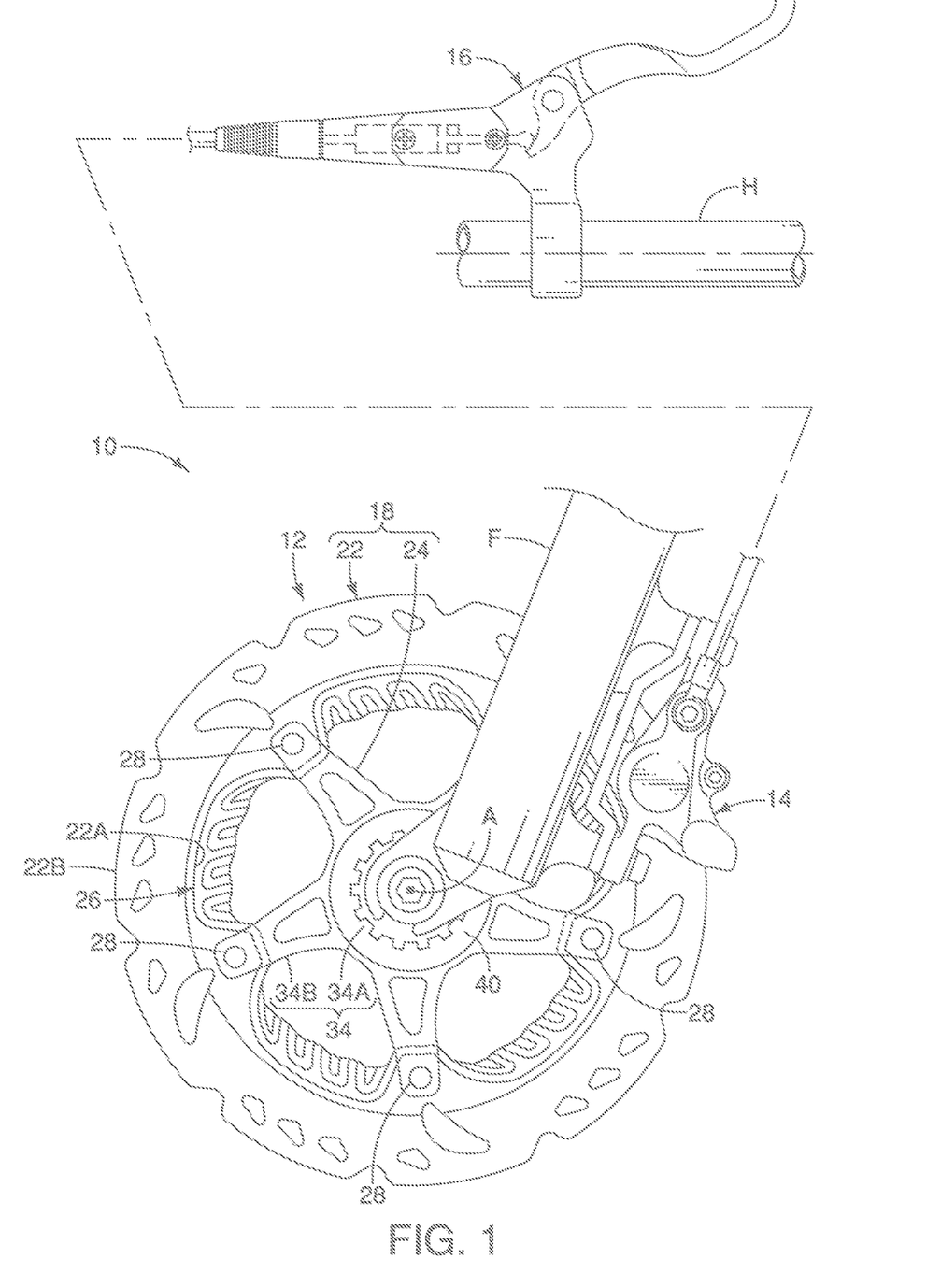
FIG. 1 is a partial side elevational view of a front disc brake system including a bicycle disc brake rotor in accordance with a first embodiment.

Referring initially to FIG. 1, a front disc brake system 10 is illustrated that includes a bicycle disc brake rotor 12 in accordance with a first embodiment. As explained below, the bicycle disc brake rotor 12 has a configuration that promotes cooling of the bicycle disc brake rotor 12. The front disc brake system 10 further includes a bicycle disc brake caliper 14 and a brake operating (actuating) device 16. Basically, the bicycle disc brake rotor 12 is fixedly attached to a hub of a bicycle wheel (not shown). Thus, the bicycle disc brake rotor 12 rotates with the hub of a bicycle wheel about a center rotational axis A of the bicycle disc brake rotor 12. The bicycle disc brake caliper 14 is mounted to a bicycle fork F, while the brake operating device 16 is attached to a bicycle handlebar H. Since the operation and construction of the front disc brake system 10 is conventional, except for the construction of the bicycle disc brake rotor 12, the front disc brake system 10 will not be discussed or shown in further detail herein. Moreover, while the front disc brake system 10 is illustrated as a hydraulic braking system, the bicycle disc brake rotor 12 can be used with other types of braking systems as needed and/or desired.

The bicycle disc brake caliper 14 is constructed for selectively gripping (stopping rotation) of the bicycle disc brake rotor 12 to stop or slow the rotation of a bicycle wheel (not shown). During this braking operation, heat is generated that is transferred to the bicycle disc brake rotor 12 and the bicycle disc brake caliper 14. As explained below, the bicycle disc brake rotor 12 is designed to dissipate the heat generated during braking.

Figure 2:
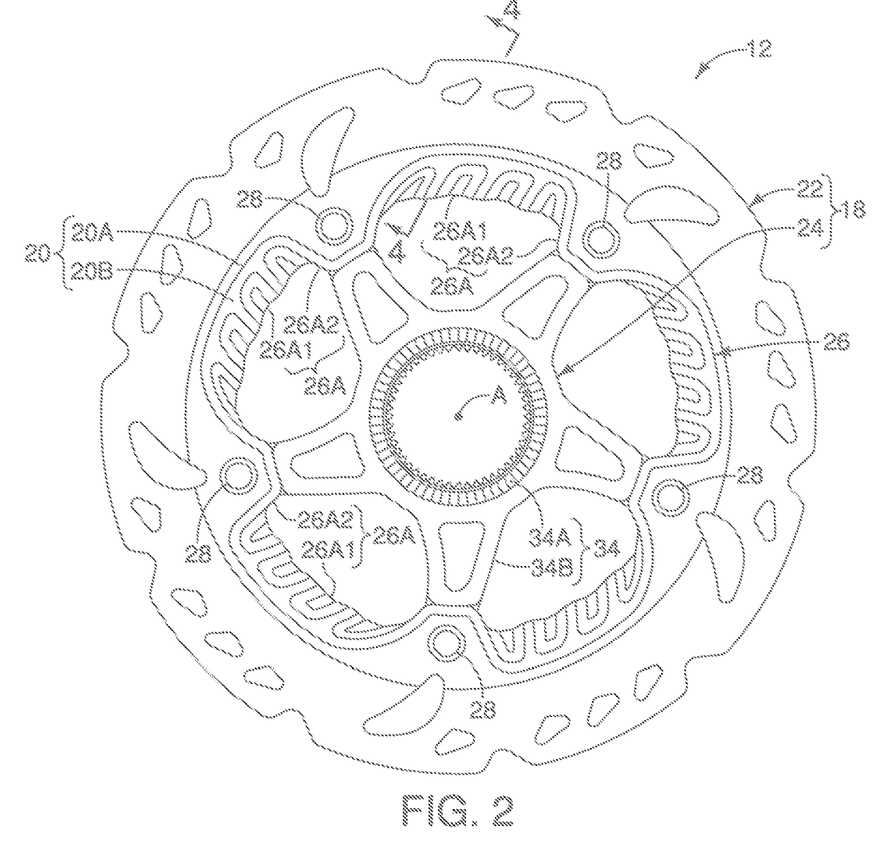
FIG. 2 is a side elevational view of the bicycle disc brake rotor illustrated in FIG. 1.
Figure 3:
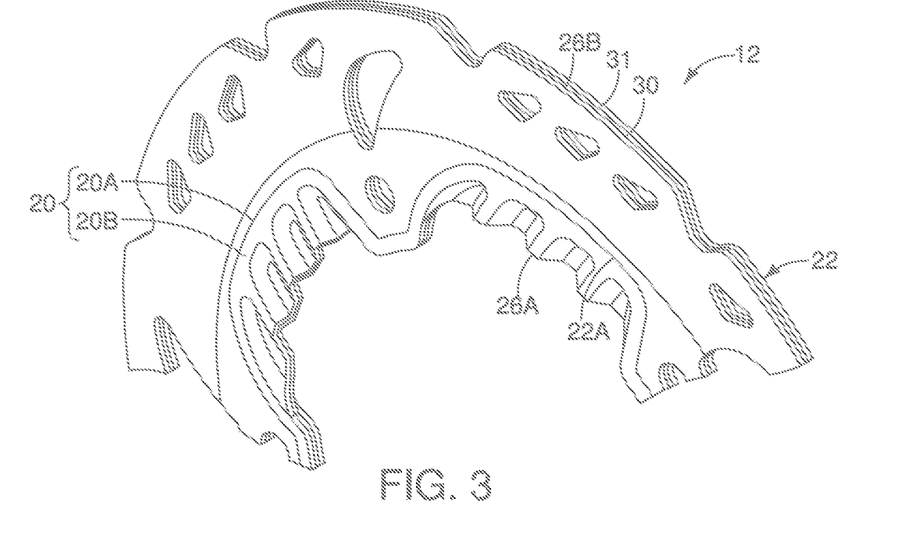
FIG. 3 is an enlarged perspective view of a portion of the bicycle disc brake rotor illustrated in FIGS. 1 and 2.
Figure 4:
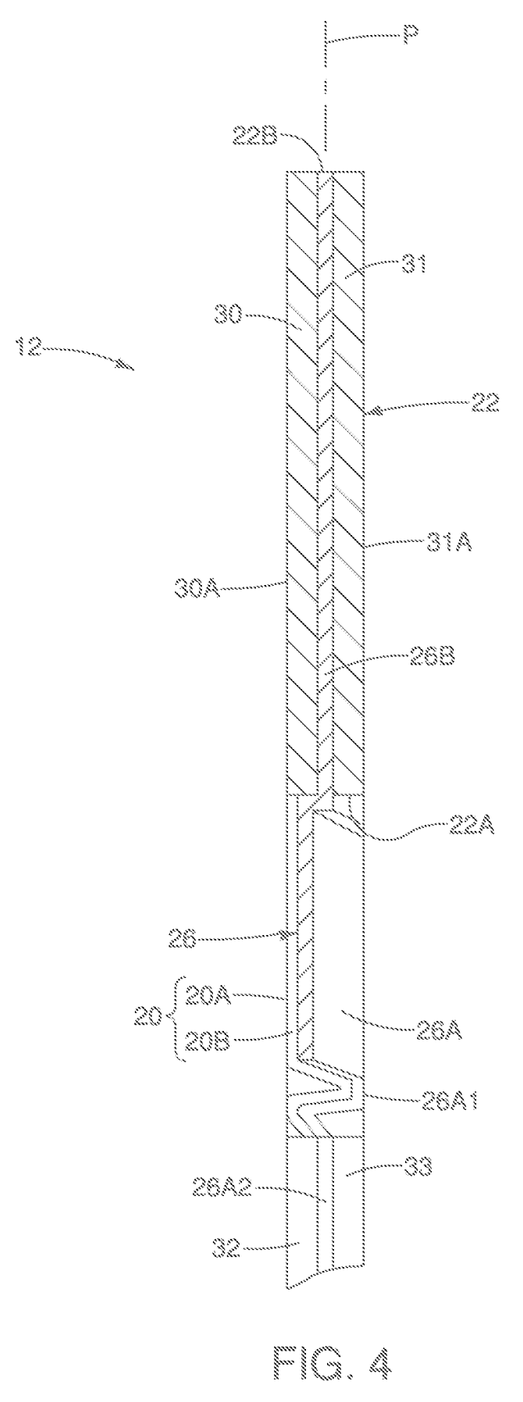
FIG. 4 is a cross sectional view of the bicycle disc brake rotor illustrated in FIGS. 1 and 2 as seen along section line 4-4 of FIG. 2.
Figure 5:
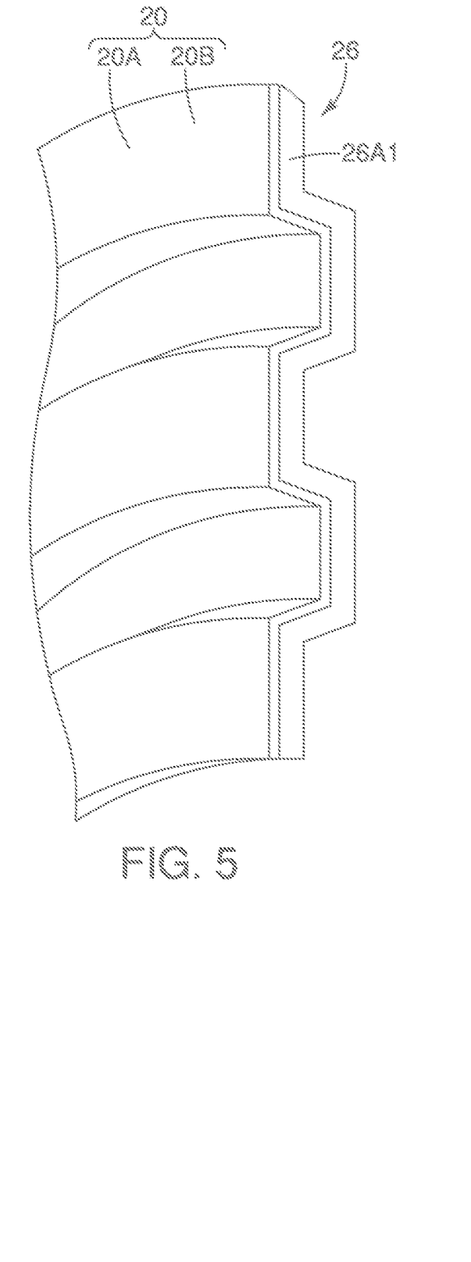
FIG. 5 is a partial view of the cooling fin of the bicycle disc brake rotor illustrated in FIGS. 1 to 4.

Referring now to FIGS. 2 to 4, the bicycle disc brake rotor 12 comprises a main body 18 and a heat release layer 20. The main body 18 is made of a metallic material. The heat release layer 20 includes a non-metallic material. The heat release layer 20 has a thickness of about 0.02 mm. In the first embodiment, the heat release layer 20 includes a heat resistant resin. More preferably, in the first embodiment, the heat release layer 20 includes a heat resistant pain 20A, and the heat resistant paint 20A includes a resin 20B. The resin 20B is a heat resistant resin such an organic polymer. The organic polymer can be either a thermoplastic resin or a thermocurable resin (e.g., a phenolic resin, an epoxy resin, an unsaturated polyester resin, a vinyl ester resin, a diallyl phthalate resin, and a polyimide resin). The term paint as used herein refers to a colored or non-colored liquid substance that is spread over a surface by spraying and/or physically applying and dries to leave a thin coating. Alternatively, the material of the heat release layer can include other types of materials such as a non-metallic layer such as an alumite coating.

As seen in FIGS. 2 and 3, the main body 18 includes an outer portion 22, an inner portion 24 and a cooling facilitation part 26. In the first embodiment, the inner portion 24 is attached to the outer portion 22 by a plurality of fasteners 28. In the first embodiment, the cooling facilitation part 26 is integrated with the outer portion 22 as explained below. The heat release layer 20 at least partially overlies the cooling facilitation part 26. The outer portion 22 is made of an aluminum alloy. The heat release layer 20 has a thermal emissivity that is larger than a thermal emissivity of the outer portion 22.

As seen in FIG. 4, the outer portion 22 has an inner peripheral edge 22A and an outer peripheral edge 22B. In the first illustrated embodiment, the outer portion 22 includes a first braking part 30 and a second braking part 31. In the first illustrated embodiment, the outer portion 22 further includes first and second mounting parts 32 and 33 for attaching the outer portion 22 to the inner portion 24 by the fasteners 28. The first braking part 30 and the first mounting part 32 are integrally formed as a one-piece member to define an annular metallic member. Likewise, the second braking part 31 and the second mounting part 33 are integrally formed as a one-piece member to define an annular metallic member. The two annular metallic members are attached to the cooling facilitation part 26 to form an integrated element. Here, in the first illustrated embodiment, the outer portion 22 with the cooling facilitation part 26 attached thereto has a maximum thickness of about 2.4 millimeters. The outer portion 22 has oppositely facing braking surfaces 30A and 31A. In other words, the braking surfaces 30A and 31A face in opposite axial directions of the bicycle disc brake rotor 12. In the first embodiment, the braking surface 30A is formed by the first braking part 30, while the braking surface 31A is formed by the second braking part 31. The braking surfaces 30A and 31A are the outermost surfaces of the bicycle disc brake rotor 12.

Referring back to FIG. 2, in the first illustrated embodiment, the inner portion 24 includes a mounting part 34 that is fastened to the outer portion 22. The mounting part 34 includes a center mounting section 34A and a plurality of arms 34B. The arms 34B extend between the outer portion 22 and the center mounting section 34A. In other words, the arms 34B extends radially inward from the outer portion 22 to the center mounting section 34A. Thus, the outer portion 22 is coupled to the outer ends of the arms 34B, and the center mounting section 34A is coupled to inner ends of the arms 34B. The outer ends of the arms 34B are attached to the outer portion 22 by the fasteners 28 (e.g., rivets). The center mounting section 34A includes a mounting opening with splines configured to be engaged with splines formed on a bicycle hub. The center mounting section 34A is mounted to the bicycle hub by a locking ring 40 as seen in FIG. 1. Thus, the bicycle disc brake rotor 12 rotates with the bicycle hub about the center rotational axis A.

Here, the center mounting section 34A and the arms 34B are formed of a single (one-piece) member of a suitable material such as aluminum alloy or other suitable lightweight material. Thus, the inner portion 24 can be either a metallic member or a non-metallic member. By making the inner portion 24 of a metallic material, the heat generated during braking can be transferred to the inner portion 24 to facilitate cooling of the first and second braking parts 30 and 31. By making the inner portion 24 of a non-metallic material, the inner portion 24 can be lighter as compared to metal inner portion. Of course, it will be apparent to those skilled in the art from this disclosure that the outer portion 22, the arms 34B and the center mounting section 34A can be integrally formed as a one-piece member. Alternatively, the outer portion 22 an the arms 34B can be integrally formed as a one-piece member that is attached to the center mounting section 34A. Also alternatively, the arms 34B can be separate pieces that are attached to both the outer portion 22 and the center mounting section 34A by suitable fasteners.

In the first embodiment, as seen in FIG. 4, the cooling facilitation part 26 includes a metallic cooling fin 26A and an attachment portion 26B. Here, the metallic cooling fin 26A and the attachment portion 26B are formed of a single metallic sheet that is deformed to the illustrated configuration. Thus, the cooling facilitation part 26 is a one-piece member in the first embodiment. The metallic cooling fin 26A is radially offset from the outer portion 22 in a radially inward direction towards a center rotational axis A of the bicycle disc brake rotor 12. In other words, the metallic cooling fin 26A extends from the inner peripheral edge 22A of the outer portion 22 and towards the center rotational axis A. In this way, the metallic cooling fin 26A is disposed radially offset from the braking surfaces 30A and 31A in the illustrated embodiment.

The heat release layer 20 is disposed on the metallic cooling fin 26A. In the first embodiment, the heat release layer 20 only overlies one radially extending face of the metallic cooling fin 26A. The metallic cooling fin 26A is disposed on an inner peripheral edge 22A of the outer portion 22. The attachment portion 26B is sandwiched between the first and second braking parts 30 and 31. In this way, the metallic cooling fin 26A is connected to the outer portion 22 by the attachment portion 26B to efficiently radiate heat from the outer portion 22 of the bicycle disc brake rotor 12. In this first embodiment, the metallic cooling fin 26A includes a plurality (five) of wave-shaped fin sections 26A1 and a plurality (five) of connecting sections 26A2. The wave-shaped fin sections 26A1 are annularly disposed about the center rotational axis A and circumferentially spaced apart from each other by the connecting sections 26A2. Preferably, the wave-shaped fin sections 26A1 are disposed entirely between the braking surfaces 30A and 31A of the outer portion 22 of the bicycle disc brake rotor 12 with respect to the axial direction of the bicycle disc brake rotor 12 as seen in FIG. 4.

In the first illustrated embodiment, the first and second mounting parts 32 and 33 of the outer portion 22 comprise a plurality of first and second mounting portions, respectively, with each pair of the corresponding first and second mounting portions being disposed between adjacent ones of the wave-shaped fin sections 26A1. To maximize the dissipation of the heat from the outer portion 22, it is preferably to have each of the wave-shaped fin sections 26A1 circumferentially disposed between adjacent pairs of the first and second mounting portions of the first and second mounting parts 32 and 33 and spanning the entire area therebetween. Of course, if needed and/or desired, fewer fin sections can be used. Also each of the wave-shaped fin sections 26A1 has a wavy shape with respect to a rotational plane P of the bicycle disc brake rotor 12 to increase the exposed surface area of the wave-shaped fin sections 26A1. The wavy shape of the wave-shaped fin sections 26A1 refers to alternating crests and troughs to form a sinusoidal shape. While the sinusoidal shape is illustrated as having uniform crests and troughs, the sinusoidal shape can be irregular with different shapes for some or all of the crests and troughs. Also, in the first illustrated embodiment, the crests and troughs include three planar sections connected by curved corners. However, other configurations of the wave-shaped fin sections 26A1 are possible.

Figure 6:
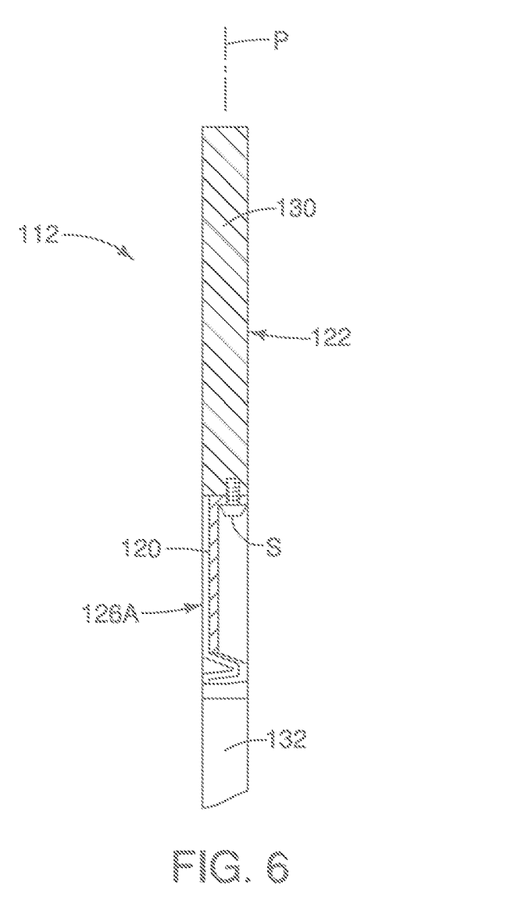
FIG. 6 is a cross sectional view, similar to FIG. 4, of a bicycle disc brake rotor in accordance with a second embodiment.

As seen in FIG. 6, a bicycle disc brake rotor 112 is illustrated in accordance with a second embodiment. The bicycle disc brake rotor 112 includes a heat release layer 120 and an outer portion 122. The bicycle disc brake rotor 112 also includes an inner portion (not shown) this is identical to the inner portion 24 of the first embodiment. The heat release layer 120 is provided on five metallic cooling fins 126A (only one shown) that form a cooling facilitation part of the bicycle disc brake rotor 112. In the second illustrated embodiment, the outer portion 122 includes a braking part 130 and a mounting part 132. Here, the outer portion 122 is a one-piece member. The metallic cooling fins 126A are mounted to the outer portion 122 by a plurality of screws S (only one shown). In other words, the outer portion 122 and the metallic cooling fins 126A are separate members that are secured together by a fastener such as a plurality of screws S or by bonding (e.g. heat resistant adhesive, welding, brazing, etc.). The metallic cooling fins 126A can be connected to the outer portion 122 in a variety of manners such as by bonding (e.g. gluing, welding, brazing, etc.).

By making the outer portion 122 and the metallic cooling fins 126A as separate members that are secured together, the materials of the outer portion 122 and the metallic cooling fins 126A can be different. Preferably, the outer portion 122 is formed of a material with corrosion resistant characteristic that is suitable for brake pad contact such as, for example, stainless steel, while the metallic cooling fins 126A are formed of a metallic material with corrosion resistant characteristic such as aluminum alloy, stainless steel or other suitable material. Preferably, the material of the metallic cooling fins 126A has a higher thermal conductivity than the outer portion 122.

The bicycle disc brake rotor 112 is identical to the bicycle disc brake rotor 12, except that in the bicycle disc brake rotor 112, the outer portion 122 is a one-piece member and the cooling facilitation part is made of several separate metallic cooling fins 126A. In other words, the construction of the heat release layer 120, the outer portion 122 and the metallic cooling fins 126A are the same as in the first embodiment, except as mentioned above. In view of the similarities between the bicycle disc brake rotors 12 and 112, for the sake of brevity, the bicycle disc brake rotor 112 will not be discussed in further detail.

Figure 7:
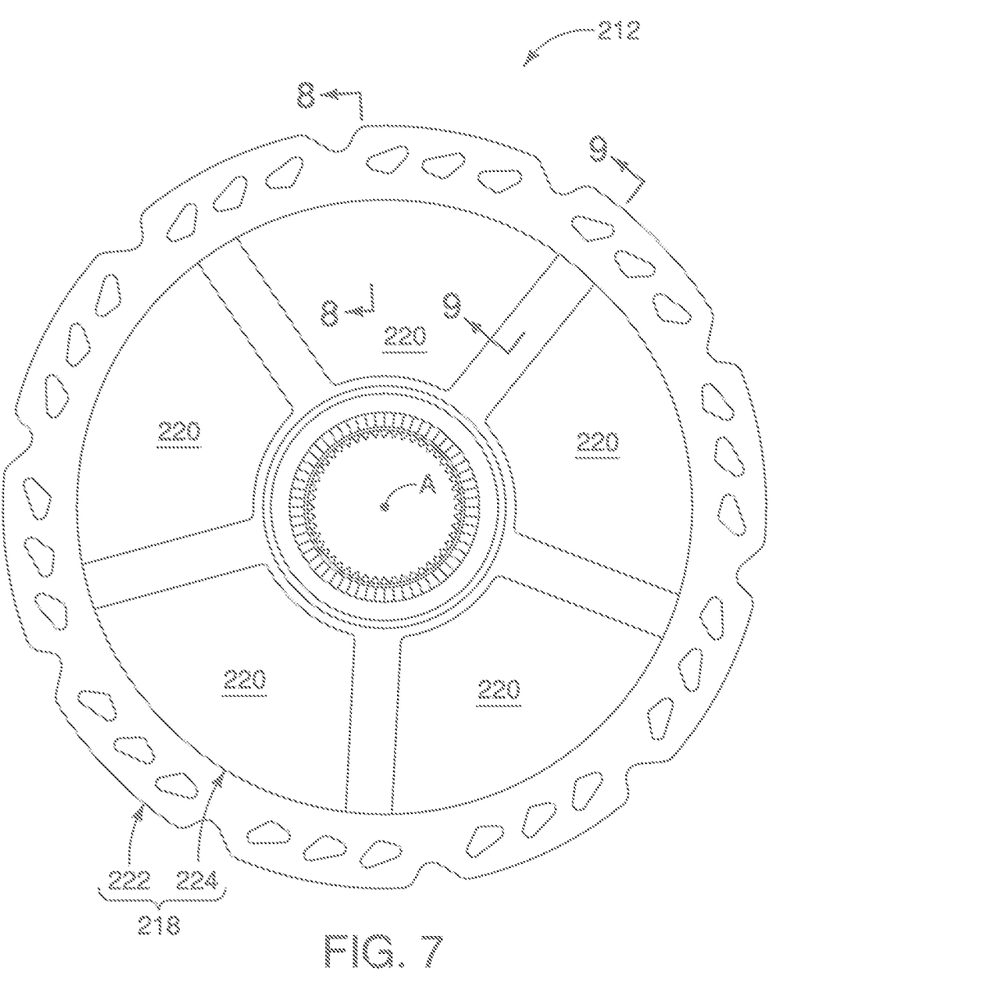
FIG. 7 is a side elevational view of a bicycle disc brake rotor in accordance with a third embodiment.
Figure 8:
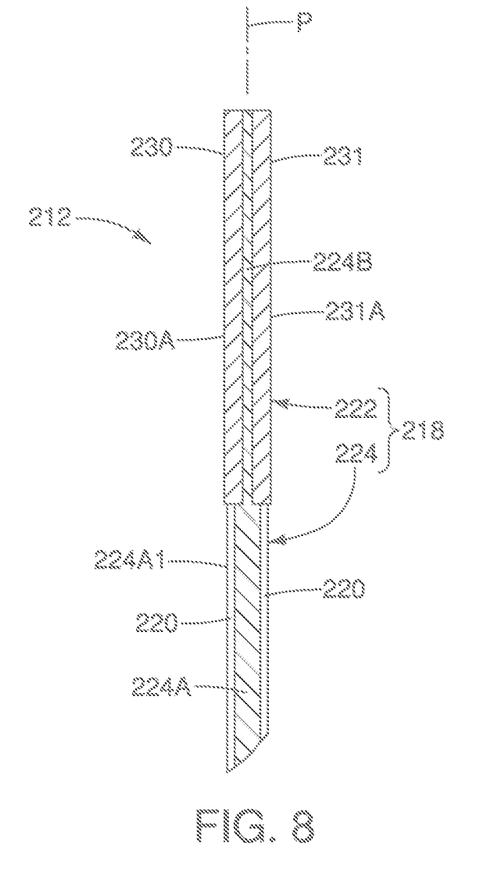
FIG. 8 is a cross sectional view of the bicycle disc brake rotor illustrated in FIG. 7 as seen along section line 8-8 of FIG. 7.
Figure 9:
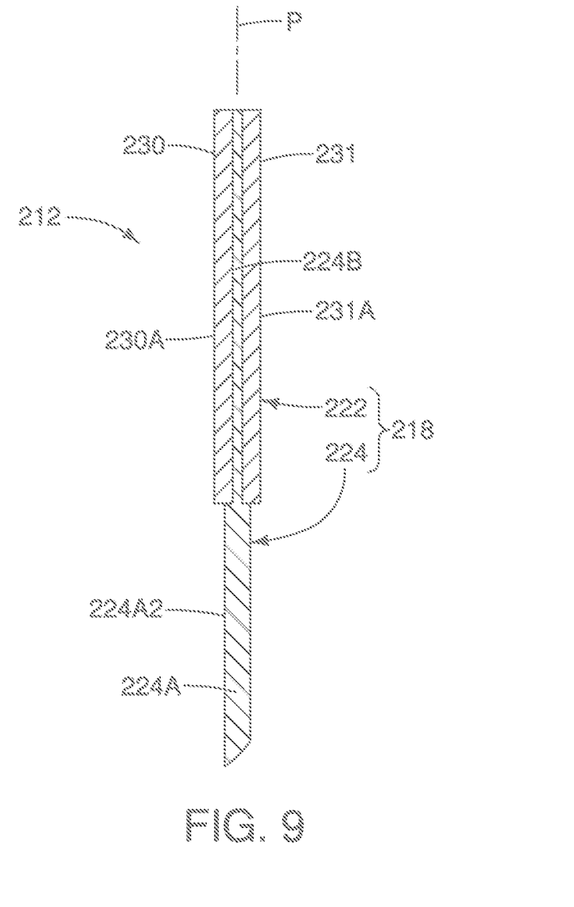
FIG. 9 is a cross sectional view of the bicycle disc brake rotor illustrated in FIG. 7 as seen along section line 9-9 of FIG. 7.

Referring now to FIGS. 7 to 9, a bicycle disc brake rotor 212 is illustrated in accordance with a third embodiment. The bicycle disc brake rotor 212 comprises a main body 218 and a heat release layer 220. The main body 218 is made of a metallic material. The main body 218 includes an outer portion 222 and an inner portion 224. In the third illustrated embodiment, the outer portion 222 includes a first braking part 230 and a second braking part 231. The outer portion 222 has oppositely facing braking surfaces 230A and 231A. The heat release layer 220 includes a non-metallic material.

The inner portion 224 includes a disc shaped section 224A at least partially covered by the heat release layer 220. The inner portion 224 further includes an attachment portion 224B that is sandwiched between the first and second braking parts 230 and 231. The disc shaped section 224A of the inner portion 224 includes a first area 224A1 on which the heat release layer 220 is disposed and a second area 224A2 which is free of the heat release layer 220. Thus, the heat release layer 220 is only partially disposed on the inner portion 224.

Similar to the first and second embodiments, the heat release layer 220 includes a heat resistant resin, and the outer portion 222 is made of an aluminum alloy. Thus, the heat release layer 220 has a thermal emissivity that is larger than a thermal emissivity of the outer portion 222. Also similar to the first and second embodiments, the heat release layer 220 includes a heat resistant paint, and the heat resistant paint includes a resin. As in the first and second embodiments, the heat release layer 220 has a thickness of about 0.02 mm. In view of the similarity between the third embodiment and the first and second embodiments, for the sake of brevity, the bicycle disc brake rotor 212 will not be discussed in further detail.

Figure 10:
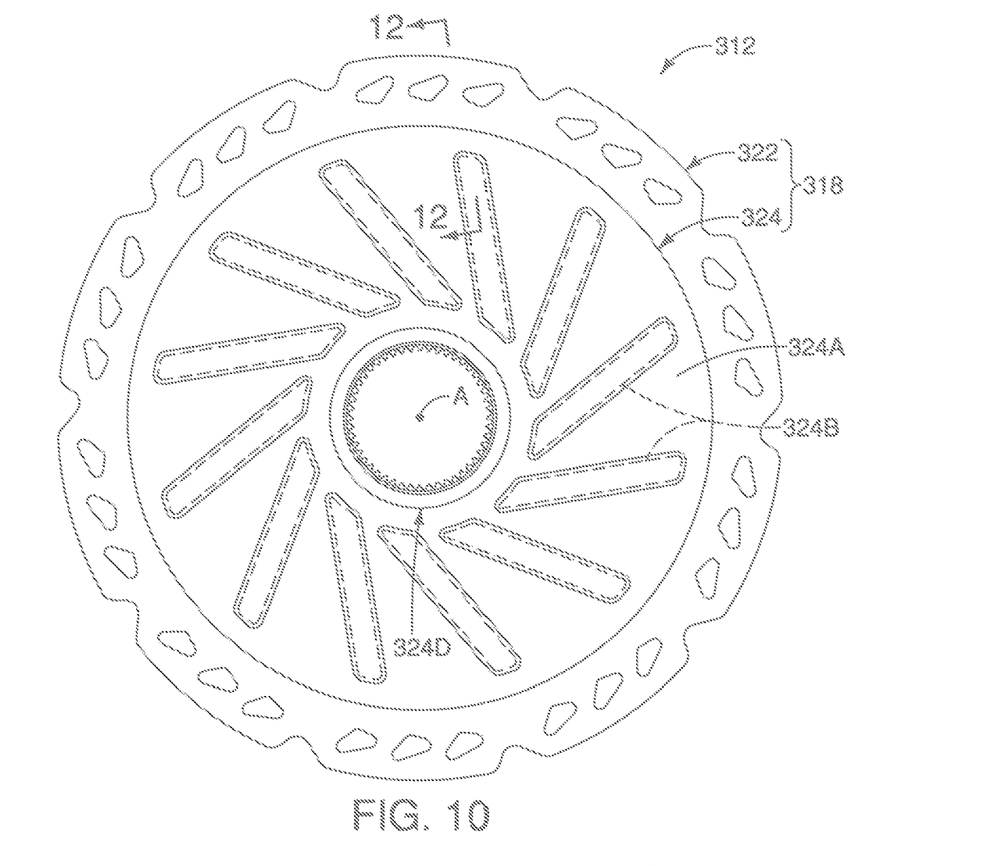
FIG. 10 is a side elevational view of a bicycle disc brake rotor in accordance with a fourth embodiment.
Figure 11:
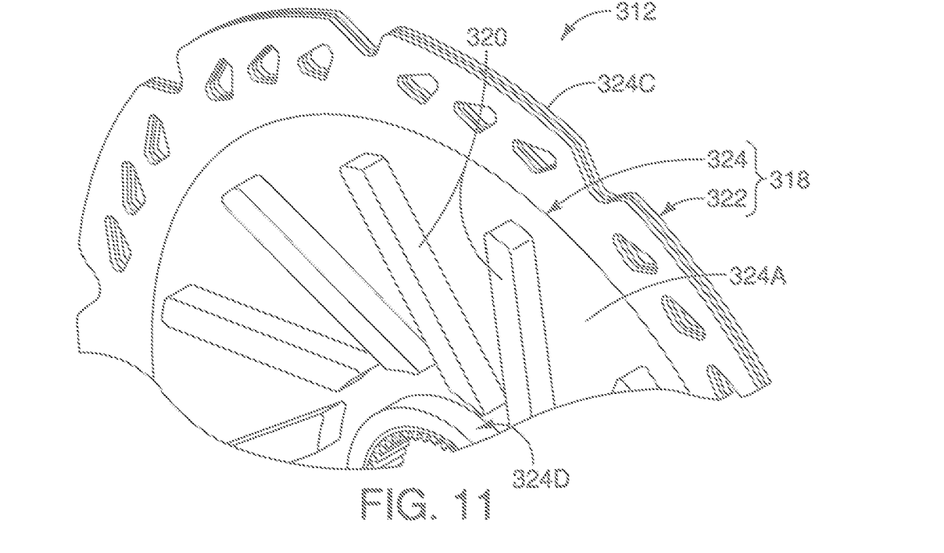
FIG. 11 is an enlarged perspective view of a portion of the bicycle disc brake rotor illustrated in FIG. 10.
Figure 12:
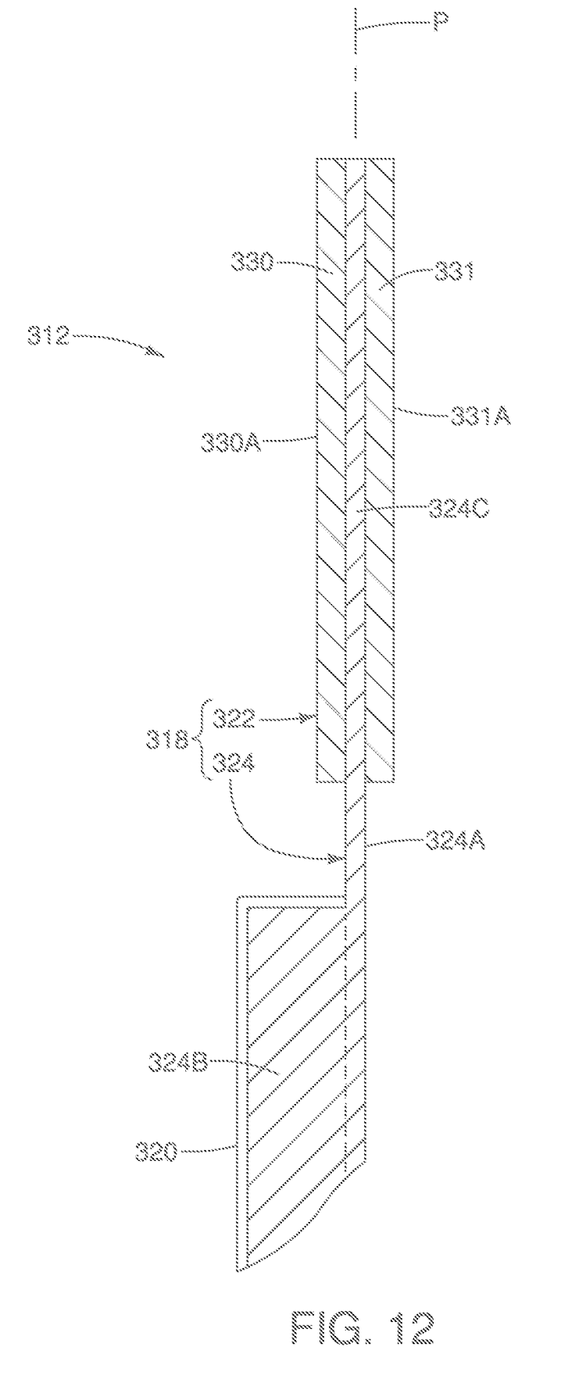
FIG. 12 is a cross sectional view of the bicycle disc brake rotor illustrated in FIGS. 10 and 11 as seen along section line 12-12 of FIG. 10.

Referring now to FIGS. 10 to 12, a bicycle disc brake rotor 312 in accordance with a fourth embodiment will now be explained. The bicycle disc brake rotor 312 comprises a main body 318 and a heat release layer 320. The main body 318 is made of a metallic material. The main body 318 includes an outer portion 322 and an inner portion 324. In the fourth illustrated embodiment, the outer portion 322 includes a first braking part 330 and a second braking part 331. The outer portion 322 has oppositely facing braking surfaces 330A and 331A. The heat release layer 320 includes a non-metallic material. The heat release layer 320 is partially disposed on the inner portion 324.

The inner portion 324 includes a disc shaped section 324A having at least one protrusion 324B extending in an axial direction with respect to a center rotational axis A of the bicycle disc brake rotor 312. here, the inner portion 324 includes an attachment portion 324C that is sandwiched between the first and second braking parts 330 and 331. The heat release layer 320 is disposed on the at least one protrusion 324B. In the fourth illustrated embodiment, the inner portion 324 has a plurality of the protrusions 324B. In other words, the at least one protrusion 324B includes a plurality of protrusions having the heat release layer 320 being disposed thereon. In this way, the heat release layer 320 is partially disposed on the inner portion 324. The other areas of the inner portion 324 are free of the heat release layer 320. In other words, the heat release layer 320 is only on the protrusions 324B. Similar to the prior illustrated embodiments, the heat release layer 320 includes a heat resistant resin, and the outer portion 322 is made of an aluminum alloy. Thus, the heat release layer 320 has a thermal emissivity that is larger than a thermal emissivity of the outer portion 322. Also similar to the prior illustrated embodiments, the heat release layer 320 includes a heat resistant paint, and the heat resistant paint includes a resin. As in the prior illustrated embodiments, the heat release layer 320 has a thickness of about 0.02 mm.

In the fourth embodiment, the inner portion 324 is illustrated as having a plurality of the protrusions 324B. However, a single protrusion (e.g., a single spiral protruding member) can be used if needed and/or desired. Thus, the protrusions 324B constitute a cooling facilitation part of the bicycle disc brake rotor 312. The disc shaped section 324A constitutes an intermediate or connection portion that interconnects the outer portion 322 and a hub mounting portion 324D. In the fourth embodiment, the protrusions 324B are protruding blocks that are tangentially arranged with respect to a reference circle that is centered about the center rotational axis A of the bicycle disc brake rotor 312. The reference circle coincides with outer periphery of the mounting opening of the hub mounting portion 324D. Of course, the protrusions 324B can be tangentially arranged with respect to other reference circles that are centered about the center rotational axis A as needed and/or desired. In view of the similarity between the fourth embodiment and the prior illustrated embodiments, for the sake of brevity, the bicycle disc brake rotor 312 will not be discussed in further detail.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion, " "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle disc brake rotor. Accordingly, these directional terms, as utilized to describe the bicycle disc brake rotor should be interpreted relative to a bicycle in an upright riding position on a horizontal surface and that is equipped with the bicycle disc brake rotor. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle disc brake rotor comprising:
   a main body made of a metallic material and including an outer portion, an inner portion and a cooling facilitation part, the outer portion having oppositely facing braking surfaces; and
   a heat release layer formed on a surface of the main body such that the heat release layer at least partially overlies the cooling facilitation part, the heat release layer including a non-metallic material selected from the group consisting of alumite, a phenolic resin, an epoxy resin, an unsaturated polyester resin, a vinyl ester resin, a diallyl phthalate resin, and a polyimide resin.

2. The bicycle disc brake rotor according to claim 1, wherein
   the heat release layer includes a heat resistant paint.

3. The bicycle disc brake rotor according to claim 2, wherein
   the heat resistant paint includes a resin.

4. The bicycle disc brake rotor according to claim 3, wherein
   the resin is selected from the group consisting of a phenolic resin, an epoxy resin, an unsaturated polyester resin, a vinyl ester resin, a diallyl phthalate resin, and a polyimide resin.

5. The bicycle disc brake rotor according to claim 1, wherein
   the cooling facilitation part includes a metallic cooling fin radially offset from the outer portion, the heat release layer being disposed on the metallic cooling fin.

6. The bicycle disc brake rotor according to claim 5, wherein
   the metallic cooling fin is disposed on an inner peripheral edge of the outer portion.

7. The bicycle disc brake rotor according to claim 5, wherein
   the outer portion includes a first braking part and a second braking part, and
   the cooling facilitation part includes an attachment portion sandwiched between the first and second braking parts.

8. The bicycle disc brake rotor according to claim 1, wherein
   the heat release layer has a thermal emissivity that is larger than a thermal emissivity of the outer portion.

9. The bicycle disc brake rotor according to claim 8, wherein
   the heat release layer includes a heat resistant resin, and the outer portion is made of an aluminum alloy.

10. The bicycle disc brake rotor according to claim 1, wherein
    the inner portion includes a mounting part that is fastened to the outer portion.

11. The bicycle disc brake rotor according to claim 10, wherein
    the mounting part includes a center mounting section and a plurality of arms extending between the outer portion and the center mounting section.

12. The bicycle disc brake rotor according to claim 1, wherein
    the inner portion includes a disc shaped section having at least one protrusion extending in an axial direction with respect to a center rotational axis of the bicycle disc brake rotor, the heat release layer being disposed on the at least one protrusion.

13. The bicycle disc brake rotor according to claim 12, wherein
    the at least one protrusion includes a plurality of protrusions having the heat release layer being disposed thereon.

14. The bicycle disc brake rotor according to claim 1, wherein
    the inner portion includes a disc shaped section at least partially covered by the heat release layer.

15. The bicycle disc brake rotor according to claim 1, wherein
    the heat release layer has a thickness of about 0.02 mm.

16. The bicycle disc brake rotor according to claim 1, wherein the heat release layer comprises a heat resistant resin.

17. The bicycle disc brake rotor according to claim 1, wherein
    the heat release layer is provided on a surface of the main body such that the heat release layer at least partially covers the cooling facilitation part.

18. The bicycle disc brake rotor according to claim 1, wherein
    the heat release layer is provided on a surface of the main body such that the heat release layer at least partially covers a cooling fin of the cooling facilitation part.

19. The bicycle disc brake rotor according to claim 1, wherein
    the heat release layer comprises an alumite coating.

20. A bicycle disc brake rotor comprising:
a main body made of a metallic material and including an outer portion and an inner portion, the outer portion having oppositely facing braking surfaces; and
a heat release layer formed on a surface of the main body such that the heat release layer is at least partially disposed on the inner portion, the heat release layer including a non-metallic material selected from the group consisting of alumite, a phenolic resin, an epoxy resin, an unsaturated polyester resin, a vinyl ester resin, a diallyl phthalate resin, and a polyimide resin.

21. A bicycle disc brake rotor comprising:
a main body made of a metallic material and including an outer portion and an inner portion, the outer portion having oppositely facing braking surfaces; and
a heat release layer formed on a surface of the main body such that the inner portion includes a first area on which the heat release layer is disposed and a second area which is free of the heat release layer, the heat release layer including a non-metallic material selected from the group consisting of alumite, a phenolic resin, an epoxy resin, an unsaturated polyester resin, a vinyl ester resin, a diallyl phthalate resin, and a polyimide resin.

* * * * *